Patented Aug. 13, 1940

2,211,510

UNITED STATES PATENT OFFICE 2,211,510

RUBBER TREATING MATERIAL

Howard D. Meincke, Glencoe, Ill.

No Drawing. Application June 18, 1937,
Serial No. 149,040

3 Claims. (Cl. 134—58)

The use of fillers in rubber products has been long known. However, it has also been known that these fillers are subject to poisoning by various ingredients which have a deleterious effect upon the curing of the rubber. For example, manganese-containing products, when employed in connection with rubber products such as rubber soles for tennis shoes and the like, produce an undesired speed of curing.

For this reason it has heretofore been the custom to use pure chemicals, and particularly is this true with calcium carbonate (whiting) which has heretofore been used in precipitated form in order that it might be extremely pure.

It has now been discovered that impure filling materials may be employed in rubber, without the ordinary deleterious effect thereof, and without lessening the filling properties thereof by coating the materials with a surface coating of an insoluble soap. For this purpose the amount of the deleterious impurity should be low, certainly below 5% and preferably below 2%. Inasmuch as manganese impurities in impure materials will normally range from .001 to 1½%, this permits the use of very common materials.

The insoluble soap coating may be applied by the method described in Hoskins Patent 1,424,306 in which the material, if not such as to react to form an insoluble soap, is washed with a solution of calcium chloride of say 3–15% concentration and then dried to produce from 1–5% of dry calcium chloride on the base—for example clay. The clay is then washed with a soap solution, for example a 5% solution of a resinate or stearate or mixed fatty acid soap, preferably a fatty acid soap.

On the other hand, if the base is an alkaline earth metal salt having some solubility, for example either calcium sulfate or calcium carbonate, no initial coating step is necessary and the reaction may be obtained by the use of a soap solution.

On the other hand, a fatty acid may be applied in the solid phase to dry calcium sulfate or carbonate, the materials being ground together until the individual particles are thoroughly coated with the fatty acid. This action may be carried out in a ball mill or other suitable contacting apparatus.

The invention is applicable to any inert material suitable for incorporation in rubber products or the like. The amount of impurity in any case should be small enough so that the formation of an insoluble soap will cover up substantially all of the material on the surface. Obviously, if a coating method such as the Hoskins patent described is employed, larger amounts of impurities are permissible.

The invention is applicable to barium sulfate, zinc oxide, magnesium salts, lead salts and other fillers.

What I claim as new and desire to secure by Letters Patent is:

1. As a product suitable for incorporation as a filler in rubber products, a particle of inert material naturally containing manganese in an amount between approximately 0.001 and 1.5%, said particle having firmly affixed thereto a skin of insoluble soap whereby the manganese impurity is rendered harmless.

2. A product as set forth in claim 1, in which the particle consists predominantly of alkaline earth material and the soap is an alkaline earth fatty acid soap.

3. The product as set forth in claim 1 in which the inert material contains approximately 1½% of manganese.

HOWARD D. MEINCKE.